May 8, 1951 W. GALLAGHER 2,551,937
VACUUM SEAL FINISH AND CLOSURE FOR JARS
Filed June 26, 1947

INVENTOR.
William Gallagher
BY William B Jaspert.

Patented May 8, 1951

2,551,937

UNITED STATES PATENT OFFICE 2,551,937

VACUUM SEAL FINISH AND CLOSURE FOR JARS

William Gallagher, Sheffield, Pa., assignor to Knox Glass Associates, Inc., Knox, Pa., a corporation of Pennsylvania Application June 26, 1947, Serial No. 757,232

2 Claims. (Cl. 215—31)

This invention relates to new and useful improvements in vacuum seal finish and closures for jars and the like, and it is among the objects thereof to provide a finish which may be accurately produced in the normal molding of jars and the like whereby it is adapted to vacuum sealing by the displacement of a rubber seal against the finished surface.

One of the difficulties in obtaining vacuum seal finishes in wide mouth ware or jars is that the finish must be perpendicular and seamless. In manufacturing by present methods the sealing surface is made in the plunger ring of the mold machine and when the plunger is brought out of the glass the plunger ring no longer contacts with the glass finish with the result that it will get out of shape before the finish properly cools. Obviously distorted finishes will not seal properly. To overcome this difficulty the finish is made in a two-part finish ring by the use of a dummy plunger ring, but this method leaves two perpendicular seams on the sealing surface and caps will not seal properly if there is a slight offset on these seams.

The present invention overcomes the difficulties by producing a vacuum seal finish not on the outside but on the inside of the container mouth, which finish is simple to manufacture in that it may be made in a two-part finish ring without leaving any seams, the two-part ring remaining in contact with the glass finish after the plunger and plunger ring have been removed. The removal of the plunger and plunger ring quickens the cooling off of the glass finish with the result that the finish remains more closely to its proper shape which assures proper and effective sealing. By the use of the two-part finish ring the finish need not be tapered as is necessary when the solid plunger ring is employed, so that by means of the two-part finish ring an accurate perpendicular seamless inner sealing finish is obtainable.

Figure 1:
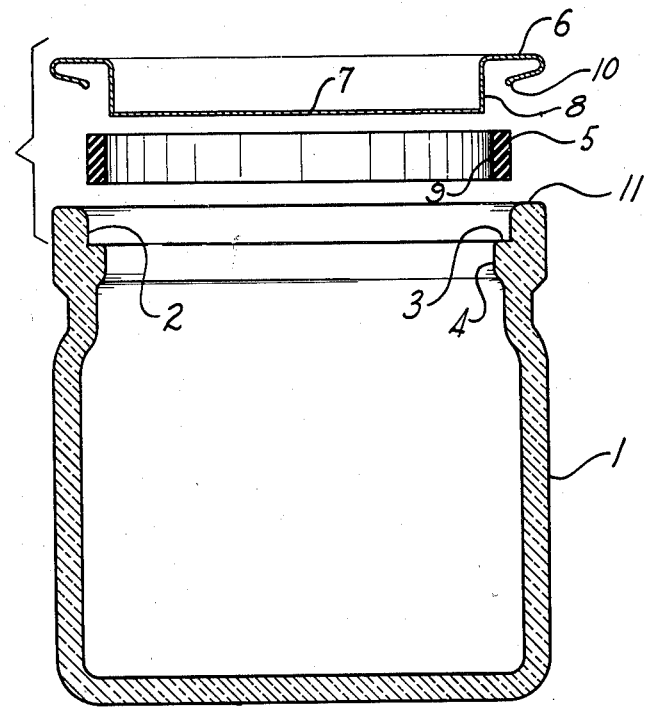
Figure 2:
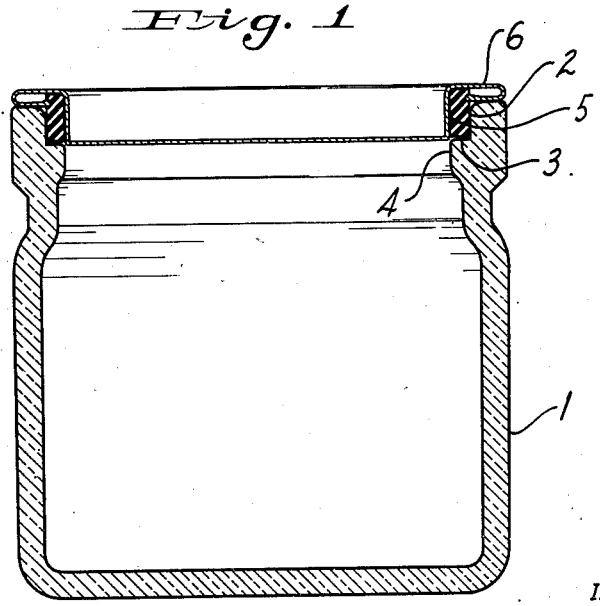

Because of the possibility of forming accurate sealing finishes on the inner wall of the jar or container, the present invention deals with a sealing cap, the form and function of which will become more apparent from a consideration of the accompanying drawing, constituting a part hereof, in which like reference characters designate like parts, and in which Fig. 1 is an exploded view in vertical section of a jar or wide mouth container and a sealer cap; and Fig. 2 a vertical cross-sectional view of the container and cap assembly.

In the drawing the numeral 1 designates a wide mouth jar having a finish designated by the reference character 2 which is perpendicular and terminates in a ledge 3 formed by a radial flange 4. The jar is sealed by a cap that comprises a rubber sealing ring 5 and a metal cap 6, the latter being depressed at 7 to form a wall 8 which engages the inner wall 9 of the rubber sealing ring 5. The outer periphery of the cap 6 is crimped with its edge 10 in the position to seat in the outer wall of the rubber sealer ring 5. The rubber ring 5 is engaged by crimping the end 10 of the metal cap 6 in the manner shown in Fig. 2.

The exploded view of Fig. 1 is merely illustrative of the parts and is not intended to illustrate the manner of capping or sealing the jar, which is done by simply placing the cap with its assembled rubber ring 5 in the neck finish 2 in the manner shown in Fig. 2. In that view it is to be noted that the rubber sealing ring 5 does not necessarily seat on the ledge 3 of the jar but seals only on the finish surface 2. The overlapping flange 6 formed by crimping over the end 10 rests on the top of the container 11 and is easily pried open by the use of a dull knife or other instrumentality.

It is to be understood that the improvement in jar finishes which consists of the vertical inner wall and a sealing cap with a resilient element engaging said wall may utilize other forms of sealer caps than that shown.

Although one embodiment of the invention has been illustrated and described it will be evident to those skilled in the art that various modifications may be made in the details of construction without departing from the principles herein set forth.

I claim:

1. In combination with a jar having an inner finish wall terminating in a ledge, of a closure comprising a sheet metal cap having a central depression forming a vertical wall complementary to the finish wall and having its outer edge folded to constitute a double radial flange, and a rubber sealing ring having straight parallel walls disposed around the vertical wall of the cap and held in crimping relation by the folded edge of the double flange to constitute the cap and ring a preassembled unitary closure, said closure when seated on the jar having the rubber sealing ring in engagement with the finish wall only and having the double flange resting on the top of the jar.

2. In combination with a jar having an inner finish wall terminating in a ledge, of a closure comprising a sheet metal cap having a central depression forming a vertical wall complementary to the finish wall and having its outer edge folded inward to constitute a resilient double flange, and a rubber sealing ring having straight parallel walls disposed around the vertical wall on the cap and held in crimping relation by the folded edge of the double flange to constitute the cap and ring a preassembled unitary closure, said closure when seated on the jar having the rubber sealing ring in engagement with the finish wall only and having the resilient folded-in portion of the double flange resting on the top of the jar.

WILLIAM GALLAGHER.

REFERENCES CITED

The following references are of record in the file of this patent:

UNITED STATES PATENTS

| Number | Name | Date |
|---|---|---|
| 104,794 | Thompson | June 28, 1870 |
| 749,565 | Jones | Jan. 12, 1904 |
| 1,276,223 | Hull | Aug. 20, 1918 |
| 1,703,573 | Carvalho | Feb. 26, 1929 |
| 1,823,786 | Crabbe | Sept. 15, 1931 |
| 1,842,226 | Williams | Jan. 19, 1932 |
| 2,357,322 | Glocker | Sept. 5, 1944 |
| 2,372,227 | Sanford | Mar. 27, 1945 |
| 2,404,409 | Smith | July 23, 1946 |
| 2,404,410 | Smith | July 23, 1946 |